United States Patent [19]

Wan et al.

[11] Patent Number: 4,603,801

[45] Date of Patent: Aug. 5, 1986

[54] DIFFUSION BONDING OF MECHANICALLY HELD COMPONENTS BY HOT ISOSTATIC PRESSURE

[75] Inventors: Chung-Chu Wan, Northridge; Glenn W. Brown, Rancho Palos Verdes, both of Calif.

[73] Assignee: The Garrett Corporation, Los Angeles, Calif.

[21] Appl. No.: 633,817

[22] Filed: Jul. 24, 1984

[51] Int. Cl.$^4$ ........................ B23K 20/02; B23K 20/16
[52] U.S. Cl. .................................... 228/194; 228/215; 228/243
[58] Field of Search ............... 228/194, 186, 214, 212, 228/215, 243, 193

[56] References Cited

U.S. PATENT DOCUMENTS 3,952,939 4/1976 Schilling et al. ..................... 228/193

FOREIGN PATENT DOCUMENTS 0048468 4/1980 Japan ................................... 228/194

Primary Examiner—Nicholas P. Godici
Assistant Examiner—Carmine Cuda
Attorney, Agent, or Firm—J. Henry Muetterties; Albert J. Miller

[57] ABSTRACT

In a hot isostatic pressing operation, an apparatus and method are disclosed for isolating the interface of the two materials to be diffusively bonded from the pressure transmitting medium. The apparatus includes a member defining a cavity which is interference fit about the interface, thus preventing the energy transmitting medium from penetrating the interface.

5 Claims, 3 Drawing Figures

DIFFUSION BONDING OF MECHANICALLY HELD COMPONENTS BY HOT ISOSTATIC PRESSURE

BACKGROUND AND SUMMARY OF THE INVENTION

The present invention relates to a method of diffusively bonding a metallic cladding to a metallic substrate; and in particular, a method of metallurgically bonding a tungsten carbide alloy cladding to a carbon steel substrate.

Surface instability of structural substrates is a significant problem in many advanced industrial and automotive applications. Highly corrosive environments are generated by the combustion process and when these highly corrosive environments are combined with high operating temperatures, limitations arise with respect to the materials which can be successfully used. Additionally, a further source of surface instability arises in high strength applications wherein protective claddings have been used in conjunction with otherwise suitable substrate to provide surface protection thereto. The bonding of a corrosion and wear resistant or high strength cladding to a substrate represents a solution to the surface instability problem.

There has been developed a process for accomplishing this desired bonding of two dissimilar metals which is known as hot isostatic pressing (HIPing) process. The hot isostatic pressing process involves the simultaneous application of pressure and temperature to a workpiece. In essence, the workpiece is squeezed from all sides at elevated temperatures. Generally, a pressure, up to approximately 30,000 psi, is applied by a pressure or energy transmitting medium; i.e. gas or molten inert glass powder or beads. The applied pressure, along with the temperature increase, causes diffusive bonding of the cladding to the substrate. Diffusive bonding is accomplished by holding the two metals to be joined in intimate contact, and thereafter heating the metals to a temperature which will cause diffusion of the atoms of one or both metal parts into the other. When the workpiece is composed of two parts of the same metal, the joint will be substantially undetectable. In the case of different metals the joint will generally be an alloy of the metals with a composition graduating from one to the other.

This process provides an ideal mechanism for controlling or totally eliminating porosity or voids which occur during other types of metal joining processes. The simultaneous application of heat and isostatic pressure combines to collapse voids by creep-like mechanisms or compressive plastic deformation and thereby joins the materials by diffusion bonding. The net result is improved reliability and efficiency of materials utilized.

Because of the tendency for most metals to acquire surface films of oxides and other compounds particularly when heated, the metal surfaces must be thoroughly cleaned and heating must be done in an inert gas, or in a vacuum to prevent further oxidation.

However, the hot isostatic pressing process is not without its problems. In some instances, surface-connected porosity has prevented complete diffusive bonding of the cladding to the substrate. This porosity has been found to be caused by the presence of the pressure transmitting medium in the cladding-substrate interface.

Several methods have been used to eliminate this problem, see U.S. Pat. Nos. 3,928,901 and 3,952,939 (Schilling, et al) and U.S. Pat. No. 3,815,219 (Wilson), which describe metallurgical methods of attaching a sheet cladding to a substrate by preforming the sheet cladding to the substrate and masking the seams formed therebetween. "Masking" involves the step of either tack welding or vacuum brazing the cladding sheet to the substrate along the seams. It is the function of masking the seams about the cladding-substrate interface to insure that during hot isostatic pressing the pressure transmitting medium is kept from entering this interface. Generally, a thin nickel plate is used as the braze material and is placed in this interface. The masked assembly is thereafter inserted into a deformable metal container which will collapse under pressures consistent with diffusion bonding. The volume of the container is such that the workpiece is completely immersed in a granular, densifying pressure transmitting medium. The container is then sealed and outgassed. Heretofore, only metallurgical methods of sealing the cladding-substrate seam from the energy transmitting medium during hot isostatic pressure were known.

It is an object of the present invention to provide an improved method of diffusion bonding of a cladding to a substrate.

It is another object of the invention to prevent penetration of the energy transmitting medium into the cladding-substrate interface during hot isostatic pressing without welding or brazing of the interface, through the use of an easy to use cladding-substrate seam isolation method and structure.

It is a further object to provide a mechanical means and method of isolating the cladding-substrate interface.

It is still a further object to provide a method and apparatus utilizing an interference fit to prevent migration of the pressure transmitting medium from entering the cladding substrate interface.

The present invention eliminates the expensive and time-consuming step of either tack welding or brazing of the cladding to the substrate before subjecting the workpiece to hot isostatic pressing. The method according to the present invention is carried out by preforming a cladding to a substrate and holding these materials together through the use of a seam isolation means. Thereafter, the cladding-substrate assembly is subjected to hot isostatic pressing. One form of the cladding-substrate seam isolation means is comprised of a cylindrical cup-shaped member which snugly secures the cladding-substrate assembly together and isolates the cladding-substrate seam by preventing migration of the energy transmitting medium from coming into contact with the seam and therefore into the cladding-substrate interface during hot isostatic pressing.

DETAILED DESCRIPTION OF THE INVENTION

Figure 1:
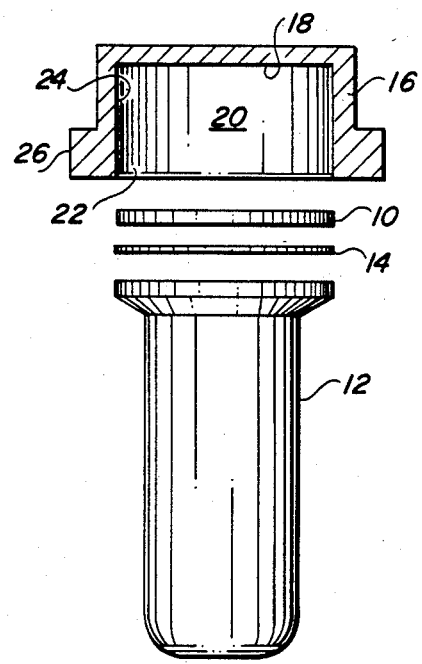
FIG. 1 is a side elevational view of the seam isolation device before assembly to the cladding-substrate.

Referring to the drawings, the apparatus and method according to the present invention are described. A cladding 10 and a substrate 12 are thoroughly cleaned prior to the practice of the present invention in order to remove any constituents detrimental to diffusion bonding. The cladding is then preformed to the substrate; i.e. the two surfaces to be diffusively bonded are made compliments of each other. Flat surfaces are generally preferred. The interfacing surfaces of the cladding and substrate can be separated with a thin nickel plate 14 and subjected to a vacuum heat treatment. Once the cladding and substrate are preformed and assembled, a seam isolator or mechanical holding device 16 is positioned in such a way that lies across the seam between the cladding and the substrate and resists the flow of the energy transmission medium, whether in a solid or molten state, from entering the seam area.

The seam isolator includes a generally cylindrical cup-shaped member 16 defining a cavity 20 therein and including a top portion of closed end 18 and an open end 22. The internal surface 24 of the isolator is interference fit about the workpiece (10, 12 and 14) and therefore isolates the cladding-substrate interface from the energy transmitting medium. In addition, an optional annular shoulder 26 encircles the open end 22 of the seam isolator in order to provide a means of assistance during assembly and disassembly of the seal isolator and the workpiece. The isolator is preferably made of a stainless steel but can be formed of any material which has a melting temperature above that of the materials which comprise the substrate and cladding and further having a coefficient of thermal expansion less than or substantially equal to that of substrate and cladding.

The interference fit between the seam isolator and the workpiece is such that the molten glass resists penetration any significant distance into the seam isolator workpiece interface and therefore does not reach the substrate-cladding seam.

This assembly is then inserted into a deformable metal container which is collapsible under pressures which produce diffusion bonding. The volume of the deformable container is such that the cladding-substrate assembly may be completely immersed in a granular, densifying pressure transmitting medium with sufficient clearances about the assembly edges such that during the diffusion bonding process none of the assembly edges will pierce the container when collapsed. Glass beads or chips are preferred as the pressure transmitting medium because the glass will densify and become molten at diffusion bonding temperatures to provide an optimum isostatic pressure transmitting medium. Moreoever, glass is relatively inert, easily outgassed and can be easily removed from the surface of the assembly after the diffusion bonding step.

After the container is filled with both the cladding-substrate assembly and the pressure transmitting medium, the container is outgassed and sealed. "Outgassing" requires that the chamber within the container be connected to a suitable vacuum pump for removal of gaseous reaction products produced therein during heating. This is accomplished by hot evacuation of the entire assembly followed by a forge-weld seal-off from the vacuum system. If outgassing is not provided for, the resulting bond may be characterized by the presence of deterimental oxides and other impurities which may adversely affect the quality of the diffusive bond.

Figure 2:
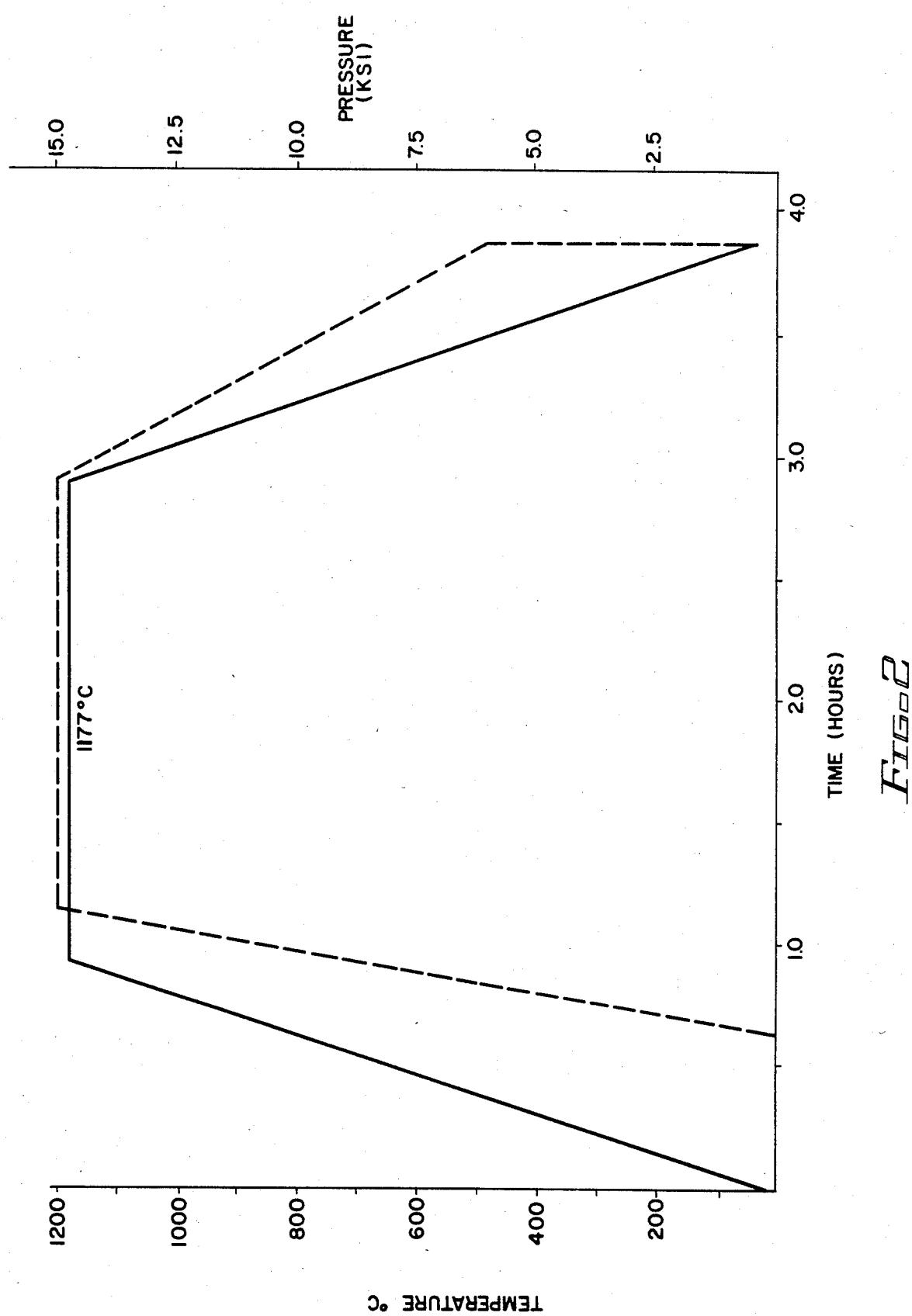
FIG. 2 is a typical temperature-pressure-time graph used during hot isostatic pressing according to the present invention.

The sealed container is placed into a hot gas autoclave (hot isostatic press) for diffusion bonding at appropriate temperatures and pressures; FIG. 2 shows the time-temperature-pressure curve for a typical bonding cycle for bonding a tungsten carbide cladding to a carbon steel substrate, though temperatures and pressures used during the diffusion bonding step are dependent upon the materials to be bonded. Considerable care is taken to avoid high pressures (7 KSI) before the pressure transmitting medium has softened. The application of high pressure before the glass chips have softened can cause a poor surface finish.

After diffusion bonding of the cladding to the substrate, the assembly is removed from the deformable container and the glass which has adhered to the surfaces of the bonded cladded-substrate assembly is removed by sandblasting or by subsequent vacuum heating and water quenching of the assembly. Thereafter, the bonded cladding-substrate assembly may be subjected to a final heat treatment, if required.

The seam isolator is removed after hot isostatic pressing by one of two methods. Depending on the materials being diffusively bonded and the material used as the seam isolator, the isolator may become partially diffusively bonded to the workpiece. In these instances, the seam isolator is ground off the workpiece. However, under normal conditions the interference fit between the seam isolator and the workpiece can be overcome by pressing the seam isolator out of engagement with the workpiece.

EXAMPLE

A carbon steel substrate having a melting temperature of approximately 2750° F. and in a machined condition to be used as a diesel engine valve lifter cap plate was chemically cleaned using a trichloroethylene solution. A thin nickel plate called a strike, 0.005" to 0.015" inches thick, was placed atop thereof, and a cladding of a tungsten carbide alloy having a melting temperature of approximately 3410° F. and approximately 0.060±0.005 inches in thickness covered the nickel plate. The preformed cladding was cleaned using a fine grit emery paper and then rinsed in acetone before being placed atop the nickel plate.

Figure 3:
FIG. 3 is a side elevational view of a tested alternative seal isolation device.

Once the cladding and nickel plate are in place atop the substrate, a mechanical holding and sealing device having a wall thickness of 0.030 inches, was interference fit over the cladding, nickel plate and a portion of the substrate such that it holds these materials together. One design of the sealing devices as tested is shown in FIG. 1, while the second design is shown in FIG. 3. The second design being a copy of the first except that the top portion was substantially eliminated thereby resulting in a sleeve-like structure. Both devices were shaped such that its cylindrical side walls lie across the joint to be bonded and prevent the flow of the energy transmitting medium from contacting the joint area. It is of utmost importance that the energy transmission medium has sufficient viscosity to resist entering the narrow openings between the mechanical holding device and the substrate.

FIG. 2 shows a temperature-pressure-time graph as was used in the present examples. Starting at ambient temperature, the temperature is raised at a rate of 20° C. per minute to approximately 1177° C. Temperature is held at that level for two hours before lowering the temperature at 20° C. per minute back to ambient. Pressurization of the container starts when the temperature reaches 800° C. and is raised to 15,000 psi in 30 minutes simultaneous with the temperature rise. The pressure level falls with the decrease in temperature and is vented when the temperature reaches the ambient temperature.

After removal of the seam isolator seals, examination of the workpieces showed that the pressure transmitting medium had not penetrated into the cladding-substrate seam of these workpieces sealed by the seam isolator seal as shown in FIG. 1 while the sleeve-like design of FIG. 3 allowed slight penetration of the medium into the cladding-substrate seam.

While the invention has been illustrated with a diesel engine valve lifter cap plate it is equally useful in other applications requiring diffusion bonding of a cladding to a substrate using the hot isostatic pressing. These and other modifications and steps will be apparent to those skilled in the art. Accordingly, the foregoing detailed description of the preferred embodiment and process of the invention are considered to be exemplary in nature and not as limiting to the scope and spirit of the invention as set forth in the appended claims.

Having thus described the invention with sufficient clarity that those skilled in the art may make and use it, what is claimed and desired to be secured by Letters Patent is:

1. In a hot isostatic pressing operation utilizing a pressure transmitting medium, the method of isolating a cladding-substrate seam comprising the steps of:
preforming a cladding to a substrate to form a workpiece;
interference fitting a seam isolator about the cladding-substrate seam;
submerging the workpiece into the pressure transmitting medium contained within a deformable container; and
subjecting said container and workpiece to hot isostatic pressing conditions.

2. The method according to claim 1 further including the step of degassing and sealing said container.

3. The method according to claim 1 further including the step of placing a nickel strike plate between the cladding and the substrate.

4. A method of hot isostatic pressing of a first material to a second material utilizing a pressure transmitting material comprising the steps of:
preforming the first material to said second material to form a workpiece with a seam therebetween;
isolating said seam from said pressure transmitting medium by interference fitting a seam isolator about the seam;
submerging said workpiece within said pressure transmitting medium within a deformable container;
degassing and sealing said container; and
subjecting said container to hot isostatic pressing conditions.

5. The method of claim 4 further including the step of placing a strike plate between the first and second material.

* * * * *